(12) United States Patent
Mendoza

(10) Patent No.: US 11,034,312 B2
(45) Date of Patent: Jun. 15, 2021

(54) VEHICLE REGISTRATION MOUNTING ASSEMBLY AND METHOD

(71) Applicant: Jun Mendoza, Midway City, CA (US)

(72) Inventor: Jun Mendoza, Midway City, CA (US)

( * ) Notice: Subject to any disclaimer, the term of this patent is extended or adjusted under 35 U.S.C. 154(b) by 0 days.

(21) Appl. No.: 16/441,259

(22) Filed: Jun. 14, 2019

(65) Prior Publication Data

US 2019/0375346 A1 Dec. 12, 2019

Related U.S. Application Data

(63) Continuation-in-part of application No. 14/657,751, filed on Mar. 13, 2015, now abandoned, which is a continuation-in-part of application No. 13/922,646, filed on Jun. 20, 2013, now abandoned.

(51) Int. Cl.
*B60R 13/10* (2006.01)
*B32B 37/12* (2006.01)
*G09F 7/12* (2006.01)

(52) U.S. Cl.
CPC ........ *B60R 13/105* (2013.01); *B32B 37/1284* (2013.01); *G09F 7/12* (2013.01); *B32B 2405/00* (2013.01); *G09F 2007/127* (2013.01)

(58) Field of Classification Search
CPC ............................... B60R 13/105; B60R 13/10
See application file for complete search history.

(56) References Cited

U.S. PATENT DOCUMENTS

| | | | |
|---|---|---|---|
| 2,190,571 A | 2/1940 | Salducco | |
| 2,369,549 A * | 2/1945 | Francescon | G09F 3/10 40/638 |
| 3,631,617 A | 1/1972 | Pekko | |
| 4,246,307 A | 1/1981 | Trautwein | |
| 4,917,928 A | 4/1990 | Heinecke | |
| 5,149,571 A | 9/1992 | Croell | |
| 5,819,449 A * | 10/1998 | Molson | B60R 13/10 40/200 |
| D406,806 S | 3/1999 | Wallace et al. | |
| 6,299,956 B1 * | 10/2001 | Freedman | B32B 27/08 428/41.8 |
| 6,324,778 B1 * | 12/2001 | Gall | B60R 13/10 40/200 |
| 6,594,926 B1 | 7/2003 | Wujciga | |
| 7,008,499 B1 * | 3/2006 | Wilson | B65D 25/36 156/247 |
| 2004/0111931 A1 | 6/2004 | Lee | |
| 2007/0157495 A1 | 7/2007 | Yang | |
| 2008/0092418 A1 * | 4/2008 | Peck | B29C 43/021 40/208 |
| 2014/0373403 A1 * | 12/2014 | Mendoza | B60R 13/105 40/200 |

(Continued)

*Primary Examiner* — Gary C Hoge

(57) ABSTRACT

A vehicle registration mounting assembly and method includes a vehicle having a bumper with an outer surface. A panel has a front side, a back side and a perimeter edge and the panel is elongated from a first side edge to a second side edge. The panel is comprised of a plastic material, which is flexible to conform to contours of the outer surface of the bumper. An adhesive is positioned on the back side of the panel. The adhesive adheres the back side of the panel to the outer surface of the bumper. A plurality of identification indicia is positioned within a laminate formed by bonding of layers of the panel to identify an owner of the vehicle.

11 Claims, 3 Drawing Sheets

(56) References Cited

U.S. PATENT DOCUMENTS

2015/0183384 A1* 7/2015 Mendoza .............. B60R 13/105
  40/208
2016/0034803 A1* 2/2016 Nam ...................... G06K 19/02
  235/488

* cited by examiner

VEHICLE REGISTRATION MOUNTING ASSEMBLY AND METHOD

PRIORITY STATUS

This application is a continuation in part of U.S. patent application Ser. No. 14/657,751 filed on Mar. 13, 2015, which was a continuation in part of U.S. patent application Ser. No. 13/922,646 filed on Jun. 20, 2013.

BACKGROUND OF THE DISCLOSURE

Field of the Disclosure

The disclosure relates to vehicle registration devices and more particularly pertains to a new vehicle registration device for placing a registration panel on a motorized vehicle.

SUMMARY OF THE DISCLOSURE

An embodiment of the disclosure meets the needs presented above by generally comprising a vehicle having a bumper with an outer surface. A panel has a front side, a back side and a perimeter edge and the panel is elongated from a first side edge to a second side edge. The panel is comprised of a plastic material, which is flexible and is configured to conform to contours of the outer surface of the bumper. An adhesive is positioned on the back side of the panel. The adhesive is configured to adhere the back side of the panel to the outer surface of the bumper. A plurality of identification indicia is positioned within a laminate formed by bonding of layers of the panel to identify an owner of the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
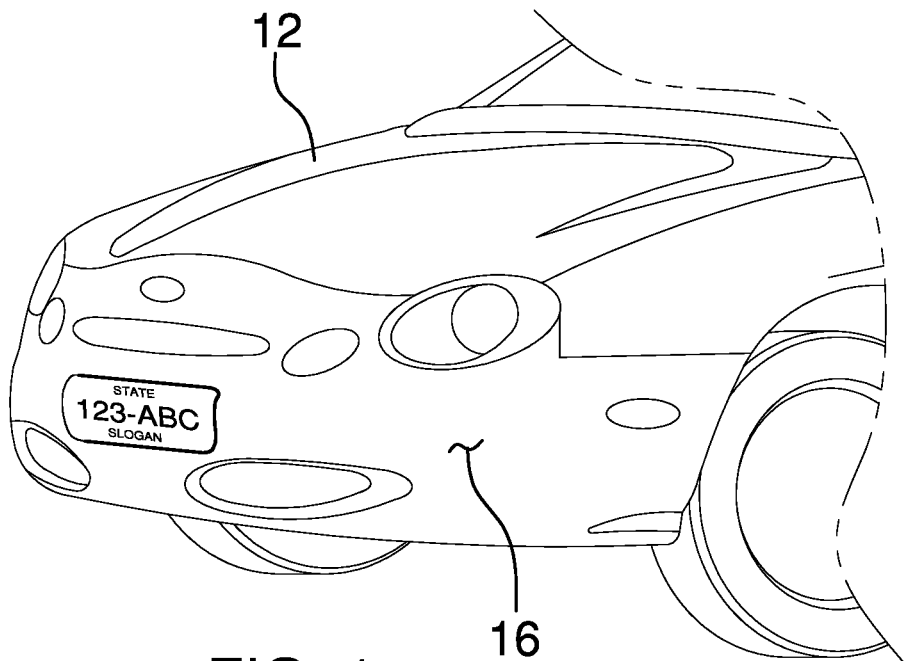
FIG. 1 is a front perspective view of a vehicle registration mounting assembly and method according to an embodiment of the disclosure.
Figure 2:
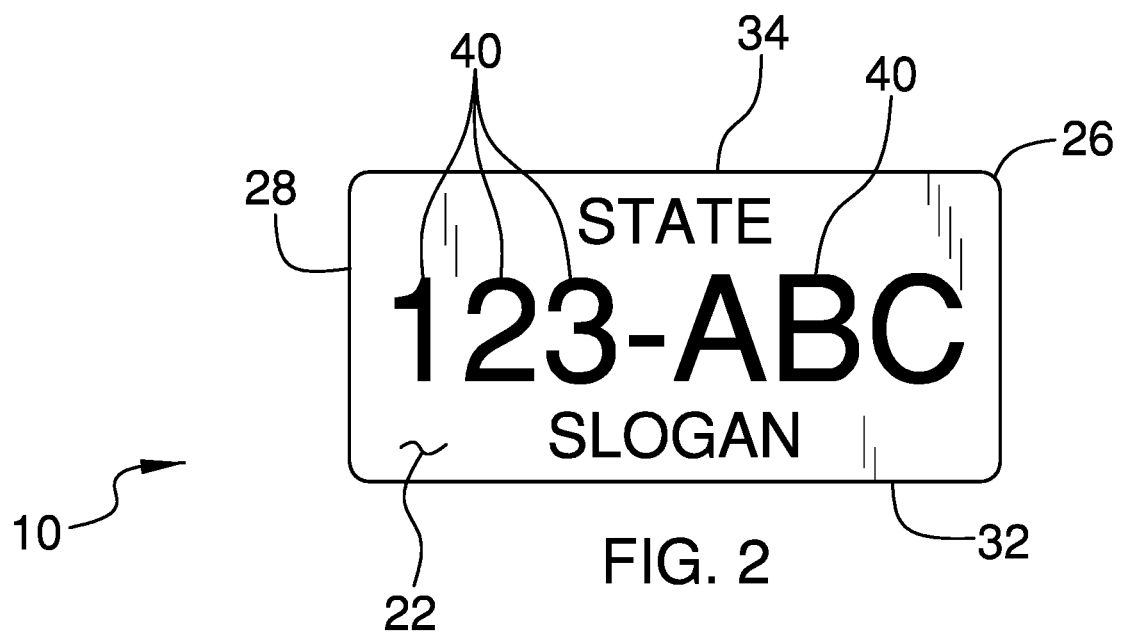
FIG. 2 is a front view of an embodiment of the disclosure.
Figure 3:
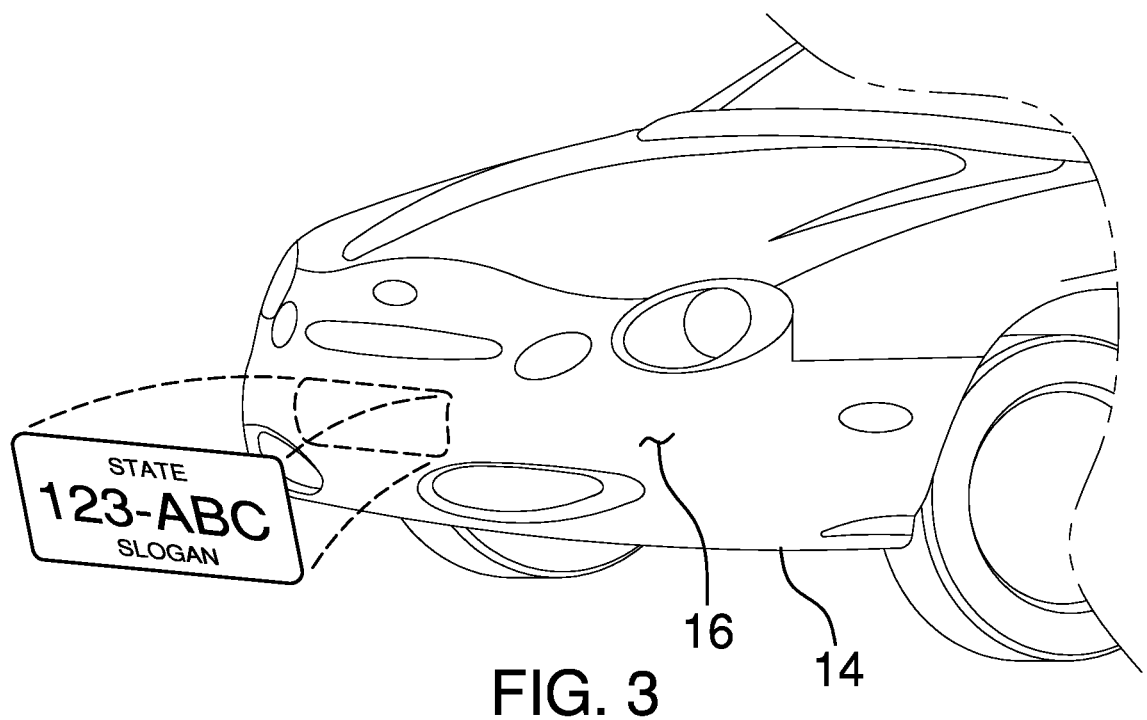
FIG. 3 is a front perspective view of an embodiment of the disclosure.
Figure 4:
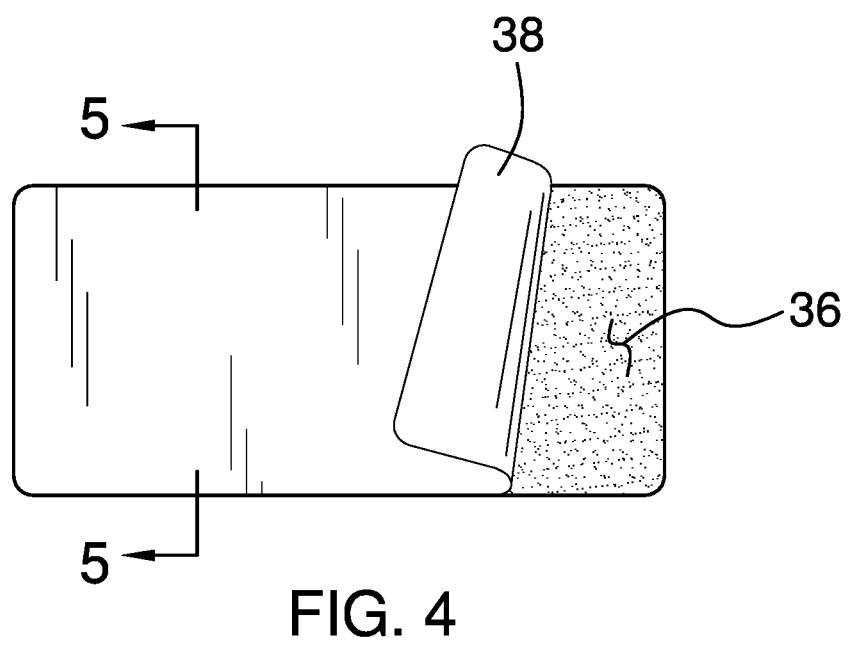
FIG. 4 is a rear view of an embodiment of the disclosure.
Figure 5:
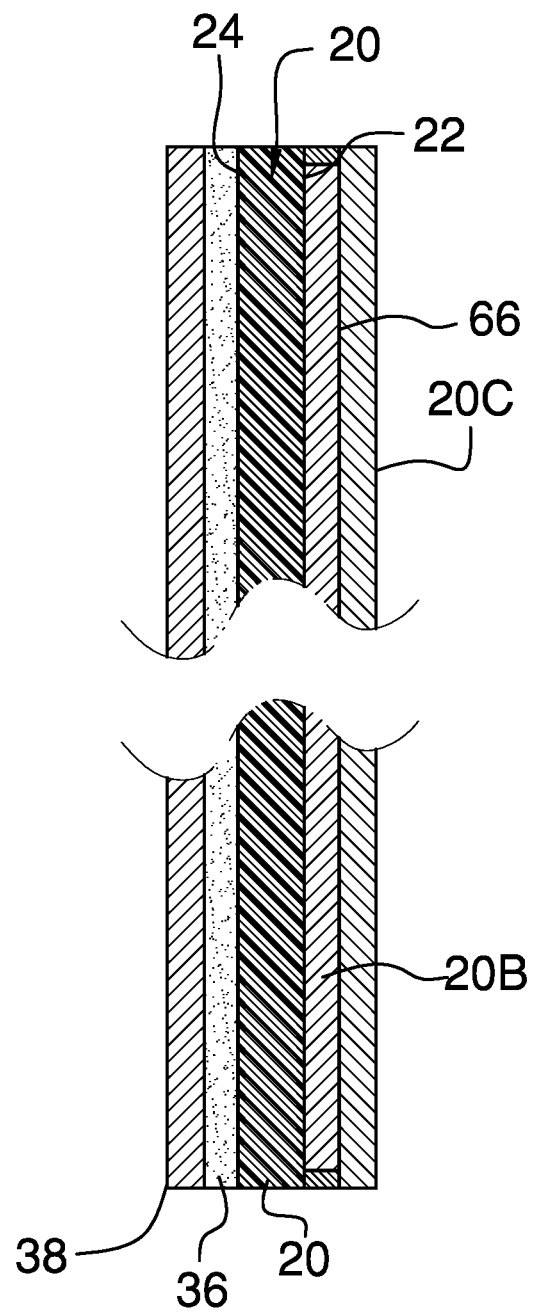
FIG. 5 is a broken cross-sectional view of an embodiment of the disclosure taken along line 5-5 of FIG. 4.

With reference now to the drawings, and in particular to FIGS. 1 through 5 thereof, a new vehicle registration device embodying the principles and concepts of an embodiment of the disclosure and generally designated by the reference numeral 10 will be described.

As best illustrated in FIGS. 1 through 5, the vehicle registration mounting assembly 10 and method generally comprises a vehicle 12 having a bumper 14 and the bumper 14 has an outer surface 16. The bumper 14 may be either the front or rear bumpers of the vehicle and will typically have portions which are not planar and rounded, particularly along its upper and lower surfaces.

A panel 20 is provided that has a front side 22, a back side 24 and a perimeter edge 26. The panel 20 is elongated from a first side edge 28 to a second side edge 30 and may have a length from the first side edge 28 to the second edge 30 approximately equal to 12.0 inches and a height from a bottom edge 32 to a top edge 34 of the panel 20 approximately equal to 6.0 inches. Different sizes may be utilized, particularly if the panel 20 is to be used as the registration for a motorcycle having a smaller required measurement. However, the typical size will be as stated since the assembly 10 will often be used for the front bumper 14 of a vehicle 12 not having front license plate mounting capabilities. The panel 20 is free of any apertures extending into the front side 22 and outwardly of the back side 24.

The panel 20 is comprised of a plastic material. The plastic material is flexible and is configured to conform to contours of the outer surface 16 of the bumper 14. The plastic material comprises a waterproof plastic material and more particularly may comprise a vinyl material. Conventional weatherproofed vinyl materials, such as those used for vehicle decals, may be used. For example, one suitable material may be Scotchall Gloss Overlaminate 8518 sold by 3M, 3M Center, St. Paul, Minn. 55411, moreover, it should be understood that the panel 20 as a whole is comprised of a plurality of layers of materials described as follows including a printed vinyl material defining a medial layer 20B covered by the Overlaminate disclosed above defining a base layer 20A. The panel 20 includes a reflective vinyl laminate such as Schotchlite IJ680CR, also sold by 3M, defining an outer layer 20C. Such materials may be retro-reflective and thus reflect light with a minimum of scattering. Another suitable material is Oralite 5650RA produced and sold by Orafol, 1100 Oracal Parkway, Black Creek, Ga. 31308. The panel 20 is a bonded laminate formed by the layers 20A, 20B, and 20C, enclosing and preventing access to the medial layer 20B such that tampering with the printed information is inhibited.

An adhesive 36 is positioned on the back side 24 of the panel 20. The adhesive 36 is configured to adhere the back side 24 of the panel 20 to the outer surface 16 of the bumper 14. Conventional adhesives used for vehicle decals may be used and should generally not be readily removable from the bumper 14 without difficulty. The panel 20 itself may include theft prevention measures such as shearing points or multiple layers causing the panel 20 to tear should someone attempt to remove the panel 20 from the bumper 14 and thus the panel 20 would no longer be intact as a single, non-torn element. A removable covering 38 is removably positioned on completely covering the adhesive 36. The covering 38 protects the adhesive 36 and is removed so that the adhesive 36 may be adhered to the bumper 14.

A plurality of identification indicia 40 is positioned on an outwardly facing side 66 of the enclosed medial layer 20B of the panel 20 to identify an owner of the vehicle 12. The identification indicia 40 will be conventional to that typically placed on state issued vehicle license plates. The indicia 40 may be non-reflective. The term "non-reflective"

generally means not highly reflective or diffuse reflection whereas the panel 20 would be highly reflective compared to the indicia 40 and thus the panel 20 would have a high value for specular reflection or retro-reflection. The indicia 40 may be printed on the medial layer 20 or may comprise another layer of vinyl which is not reflective. For instance, the panel 20 may be comprised of a reflective vinyl upon which the non-reflective indicia 40 are positioned. The medial layer 20B and indicia 40 thereon is then laminated. Other markings or designs may be positioned on the medial layer 20B as well and may or may not be reflective in nature.

In use, the assembly 10 will typically be used with vehicles which do not have brackets or mounting apertures on their front bumper 14. This is often the case with sports vehicles and requires the owner to either add apertures to be used by themselves or with a mounting bracket. The owner obtains a panel 20 having the correct registration indicia 40 therein and removes the covering from the panel 20. The panel 20 is then placed on the bumper 14, meeting the contours of the bumper 14, until it is fully adhered to the bumper 14 while ensuring that areas adjacent the perimeter edge 26 are completely flat against the bumper 14. When the registration expires, the panel 20 may be replaced or registration tags may be adhered to an exposed face of the panel 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle registration and identification system, said system comprising:
    a vehicle having a bumper, said bumper having an outer surface;
    a panel having a front side, a back side and a perimeter edge, said panel being elongated from a first side edge to a second side edge;
    said panel being comprised of a plastic material, said plastic material being flexible and being configured to conform to contours of said outer surface of said bumper, said panel comprising a plurality of bonded layers of material forming a laminate;
    an adhesive being positioned on said back side of said panel, said adhesive adhering said back side of said panel to said outer surface of said bumper such that said panel conforms to a non-planar surface of said bumper, said panel being shearable to inhibit removal of said panel from said bumper such that said panel remains intact; and
    a plurality of identification indicia being positioned within said laminate to identify an owner of said vehicle.

2. The vehicle registration and identification system according to claim 1, wherein said panel has a length from said first side edge to said second edge approximately equal to 12.0 inches and a height from a bottom edge to a top edge of said panel approximately equal to 6.0 inches.

3. The vehicle registration and identification system according to claim 2, wherein said panel is free of any apertures extending into said front side and outwardly of said back side.

4. The vehicle registration and identification system according to claim 1, wherein said plastic material comprises waterproof plastic materials.

5. The vehicle registration and identification system according to claim 4, said plastic material being vinyl laminate material.

6. The vehicle registration and identification system according to claim 1, further including a covering being removably positioned on completely covering said adhesive.

7. A vehicle registration and identification system, said system comprising:
    a vehicle having a bumper, said bumper having an outer surface;
    a panel having a front side, a back side and a perimeter edge, said panel being elongated from a first side edge to a second side edge, said panel having a length from said first side edge to said second edge approximately equal to 12.0 inches and a height from a bottom edge to a top edge of said panel approximately equal to 6.0 inches, said panel being free of any apertures extending into said front side and outwardly of said back side;
    said panel being comprised of a plastic material, said plastic material being flexible and being configured to conform to contours of said outer surface of said bumper, said plastic material comprising a waterproof plastic material, said plastic material being a vinyl laminate material, said panel comprising a plurality of bonded layers of the material forming a laminate;
    an adhesive being positioned on said back side of said panel, said adhesive being configured to adhere said back side of said panel to said outer surface of said bumper, said adhesive comprising a single layer of adhesive, said panel being shearable to inhibit removal of said panel from said bumper;
    a covering being removably positioned on completely covering said adhesive; and
    a plurality of identification indicia being positioned within said laminate to identify an owner of said vehicle.

8. The vehicle registration and identification system according to claim 1, wherein said panel is comprised of a retro-reflective material.

9. The vehicle registration and identification system according to claim 1, wherein said indicia is non-reflective.

10. The vehicle registration and identification system according to claim 7, wherein said panel is comprised of a retro-reflective material.

11. The vehicle registration and identification system according to claim 10, wherein said indicia is non-reflective.

* * * * *